United States Patent
Huh et al.

(10) Patent No.: US 10,018,234 B2
(45) Date of Patent: Jul. 10, 2018

(54) APPARATUS FOR CONTROLLING COASTING OPERATION IN HYBRID VEHICLE, SYSTEM INCLUDING THE SAME, METHOD THEREOF

(71) Applicants: HYUNDAI MOTOR COMPANY, Seoul (KR); KIA MOTORS CORPORATION, Seoul (KR)

(72) Inventors: Jee Wook Huh, Bucheon-si (KR); Do Hee Kim, Seongnam-si (KR); Gwang Il Du, Incheon (KR); Chun Hyuk Lee, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 11 days.

(21) Appl. No.: 15/437,844

(22) Filed: Feb. 21, 2017

(65) Prior Publication Data
US 2018/0149212 A1 May 31, 2018

(30) Foreign Application Priority Data
Nov. 25, 2016 (KR) .................. 10-2016-0158326

(51) Int. Cl.
*F16D 48/06* (2006.01)
*B60W 20/00* (2016.01)
*B60K 6/387* (2007.10)

(52) U.S. Cl.
CPC .............. *F16D 48/06* (2013.01); *B60K 6/387* (2013.01); *B60W 20/00* (2013.01);
(Continued)

(58) Field of Classification Search
CPC .......... F16D 48/06; F16D 2500/10412; F16D 2500/3108; F16D 2500/3124;
(Continued)

(56) References Cited

U.S. PATENT DOCUMENTS 6,312,357 B1 * 11/2001 Sakai .................. F16H 61/6648
477/37
2002/0115529 A1 * 8/2002 Narita ................. F16H 61/6648
477/40

(Continued)

FOREIGN PATENT DOCUMENTS

JP        5822946 B2      10/2015
KR     10-1526813 B1       6/2015
(Continued)

*Primary Examiner* — Richard M Camby
(74) *Attorney, Agent, or Firm* — Brinks Gilson & Lione

(57) ABSTRACT

An apparatus and a method for controlling a coasting operation in a hybrid vehicle are provided. The apparatus includes: a coasting operation control mode entrance time point determination unit to determine a time point at which a subject vehicle enters a coasting operation control mode; a target vehicle speed reach time point calculation unit to calculate a target vehicle speed of the subject vehicle and a time point, at which the subject vehicle reaches the target vehicle speed, when the subject vehicle enters the coasting operation control mode; and a creep torque variation control unit to control creep torque of the subject vehicle using a difference between the target vehicle speed and a present vehicle speed of the subject vehicle.

23 Claims, 7 Drawing Sheets

(52) U.S. Cl.
CPC ..... *B60Y 2200/92* (2013.01); *B60Y 2300/181* (2013.01); *B60Y 2300/18075* (2013.01); *B60Y 2300/18125* (2013.01); *F16D 2500/10412* (2013.01); *F16D 2500/3108* (2013.01); *F16D 2500/3124* (2013.01); *Y10S 903/914* (2013.01); *Y10S 903/946* (2013.01)

(58) Field of Classification Search
CPC .... B60W 20/00; B60K 6/387; B60Y 2200/92; B60Y 2300/18125; B60Y 2300/181; B60Y 2300/18075; Y10S 903/946; Y10S 903/914
See application file for complete search history.

(56) References Cited

U.S. PATENT DOCUMENTS

| | | |
|---|---|---|
| 2015/0134159 A1 | 5/2015 | Johri et al. |
| 2016/0068151 A1 | 3/2016 | Kim et al. |

FOREIGN PATENT DOCUMENTS

| | | |
|---|---|---|
| KR | 10-1628563 B1 | 6/2016 |
| WO | 2013080335 A1 | 6/2013 |

\* cited by examiner

APPARATUS FOR CONTROLLING COASTING OPERATION IN HYBRID VEHICLE, SYSTEM INCLUDING THE SAME, METHOD THEREOF

CROSS-REFERENCE TO RELATED APPLICATION

This application claims priority to and the benefit of Korean Patent Application No. 10-2016-0158326, filed on Nov. 25, 2016, which is incorporated herein by reference in its entirety.

FIELD

The present disclosure relates to an apparatus for controlling a coasting operation in a hybrid vehicle and a method thereof, and more particularly, to a technique of efficiently controlling a coasting operation.

BACKGROUND

The statements in this section merely provide background information related to the present disclosure and may not constitute prior art.

To improve fuel efficiency, vehicle manufacturers have introduced various control technologies to be utilized for a vehicle's deceleration stage, such as regenerative control and fuel-cut control based on road environments and/or the input of the deceleration by a driver. The interest in an apparatus and a method for controlling a coasting operation is continuously increased. Recently, efforts to develop vehicles to travel the maximum distance while consuming the minimum fuel consumption through the coasting operation have been made in various vehicle industries.

The coasting operation is a driving mode to gradually decelerate a vehicle speed using driving energy of a vehicle while it runs without any acceleration input from a driver. When a hybrid vehicle performs the coasting operation, the hybrid vehicle may charge a battery with power using a motor. Accordingly, the coasting operation is an important factor to increase charging efficiency and fuel efficiency.

According to the related art, to control such a coasting operation, a simple map-based manner is used to map a front vehicle to a distance. Since the front vehicle is simply mapped to the distance, the coasting operation may not be accurately controlled, a large quantity of mapping time is required, and logic is complicated.

SUMMARY

The present disclosure addresses the above-mentioned problems occurring in the prior art while advantages achieved by the prior art are maintained intact.

One form of the present disclosure provides an apparatus for controlling a coasting operation in a hybrid vehicle, capable of simplifying coasting operation control logic, of applying coasting operation control even to a flat road through creep torque variation, and of improving the accuracy of the coasting operation control even in a flat road, and a method thereof.

The technical problems addressed by the present disclosure are not limited to the aforementioned problems, and any other technical problems not mentioned herein will be clearly understood from the following description by those skilled in the art to which the present disclosure pertains.

According to an aspect of the present disclosure, an apparatus for controlling a coasting operation in a hybrid vehicle, may include: a coasting operation control mode entrance time point determination unit configured to determine a first time point at which a subject vehicle enters a coasting operation control mode; a target vehicle speed reach time point calculation unit configured to calculate a target vehicle speed of the subject vehicle and a second time point, at which the subject vehicle reaches the target vehicle speed, when the subject vehicle enters the coasting operation control mode; and a creep torque variation control unit configured to control creep torque using a difference between the target vehicle speed and a present vehicle speed of the subject vehicle.

According to one form, the coasting operation control mode entrance time point determination unit may calculate a third time point at which the subject vehicle arrives at a front vehicle using a difference between the present vehicle speed of the subject vehicle and a present vehicle speed of the front vehicle, and a distance between the subject vehicle and the front vehicle and may enter the coasting operation control mode when the third time point, at which the subject vehicle arrives at the front vehicle, is within a preset threshold value.

According to another form, the target vehicle speed reach time point calculation unit may calculate the target vehicle speed using the present vehicle speed of the front vehicle and may calculate the second time point at which the subject vehicle reaches the target vehicle speed using the present vehicle speed of the front vehicle and the distance between the front vehicle and the subject vehicle.

According to another form, the target vehicle speed reach time point calculation unit may calculate the second time point at which the subject vehicle reaches the target vehicle speed using a coast down value, a downhill load, an uphill load, and creep torque of the subject vehicle.

According to still another form, the creep torque variation control unit may decrease the creep torque when the present vehicle speed of the subject vehicle is higher than the target vehicle speed, and may increase the creep torque when the present vehicle speed of the subject vehicle is lower than the target vehicle speed.

According to another form, the creep torque variation control unit may determine whether regenerative braking occurs when braking is desired after the creep torque control, may maintain the creep torque when the regenerative braking occurs, may change the creep torque to previous creep torque, which is present before the creep torque control, when brake-off occurs while the creep torque is maintained, and may change the creep torque to the previous creep, which is present before the creep torque control, when the regenerative braking does not occur.

In one form, the creep torque variation control unit may determine whether the subject vehicle arrives at the second time point at which the subject vehicle reaches the target vehicle speed, when the braking is not desired after the creep torque control, and may terminate the coasting operation control mode when the subject vehicle arrives at the second point at which the subject vehicle reaches the target vehicle speed.

In another form, the apparatus may further include a clutch lock-up control unit to control clutch lock-up using the present vehicle speed of the subject vehicle and the present vehicle speed of the front vehicle in the coasting operation control mode.

In still another form, the clutch lock-up control unit may perform clutch open control when the present vehicle speed of the subject vehicle is higher than the present vehicle speed of the front vehicle, and may maintain the clutch lock-up when the present vehicle speed of the subject vehicle is lower than the present vehicle speed of the front vehicle.

According to one form, the clutch lock-up control unit may perform the clutch open control when braking is desired in the maintaining of the clutch lock-up, may determine whether the second time point, at which the subject vehicle reaches the target vehicle speed, comes in the performing of the clutch open control, and may terminate the coasting operation control mode when the second time point, at which the subject vehicle reaches the target vehicle speed, comes.

According to another aspect of the present disclosure, a method of controlling a coasting operation in a hybrid vehicle, may include: determining, by a coasting operation control mode entrance time point determination unit, a first time point at which a subject vehicle enters a coasting operation control mode; calculating, by a target vehicle speed reach time point calculation unit, a target vehicle speed of the subject vehicle and a second time point, at which the subject vehicle reaches the target vehicle speed, when the subject vehicle enters the coasting operation control mode; and controlling, by a clutch lock-up control unit, clutch lock-up using a present vehicle speed of the subject vehicle and a present vehicle speed of a front vehicle in the coasting operation control mode.

According to another aspect of the present disclosure, a method of controlling a coasting operation in a hybrid vehicle, may include: determining, by a coasting operation control mode entrance time point determination unit, a first time point at which a subject vehicle enters a coasting operation control mode; calculating, by a target vehicle speed reach time point calculation unit, a target vehicle speed of the subject vehicle and a second time point, at which the subject vehicle reaches the target vehicle speed, when the subject vehicle enters the coasting operation control mode; and controlling, by a creep torque variation control unit, creep torque using a difference between the target vehicle speed and a present vehicle speed of the subject vehicle.

According to one form, the determining of the first time point at which the subject vehicle enters the coasting operation control mode may include: calculating a third time point at which the subject vehicle arrives at a front vehicle using a difference between the present vehicle speed of the subject vehicle and a present vehicle speed of the front vehicle, and a distance between the subject vehicle and the front vehicle; and entering the coasting operation control mode when the third time point, at which the subject vehicle arrives at the front vehicle, within a preset threshold value.

According to another form, the calculating of the target vehicle speed and the second time point may include: calculating the target vehicle speed using the present vehicle speed of the front vehicle; and calculating the second time point using the present vehicle speed of the front vehicle and the distance between the front vehicle and the subject vehicle.

According to another form, the calculating of the second time point may use a coast down value, an uphill load, a downhill load, and creep torque of the subject vehicle.

According to another form, the controlling of the creep torque may include decreasing the creep torque when the present vehicle speed of the subject vehicle is higher than the target vehicle speed, and increasing the creep torque when the present vehicle speed of the subject vehicle is lower than the target vehicle speed.

In one form, the controlling of the creep torque may further include: determining whether regenerative braking occurs, when braking is desired after the creep torque control; maintaining the creep torque when the regenerative braking occurs; and changing the creep torque to a previous creep torque, which is present before the creep torque control, when brake-off occurs while the creep torque is maintained.

In another form, the controlling of the creep torque may further include changing the creep torque to the previous creep torque, which is present before the creep torque control, when the regenerative braking does not occur.

In still another form, the method may further include: determining whether the subject vehicle arrives at the second point at which the subject vehicle reaches the target vehicle speed, when the braking is not desired after the creep torque control; and terminating the coasting operation control mode when the subject vehicle arrives at the second time point at which the subject vehicle reaches the target vehicle speed.

According to one form, the method may further include controlling clutch lock-up using the present vehicle speed of the subject vehicle and the present vehicle speed of the front vehicle in the coasting operation.

According to another form, the controlling of the clutch lock-up may include performing clutch open control when the present vehicle speed of the subject vehicle is higher than the present vehicle speed of the front vehicle, and maintaining the clutch lock-up when the present vehicle speed of the subject vehicle is lower than the present vehicle speed of the front vehicle.

According to still another form, the controlling of the clutch lock-up may further include performing the clutch open control when braking is desired in the maintaining of the clutch lock-up.

According to another form, the controlling of the clutch lock-up may further include: determining whether the second time point, at which the subject vehicle reaches the target vehicle speed, comes in the performing of the clutch open control; and terminating the coasting operation control mode when the second time point, at which the subject vehicle reaches the target vehicle speed, comes.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
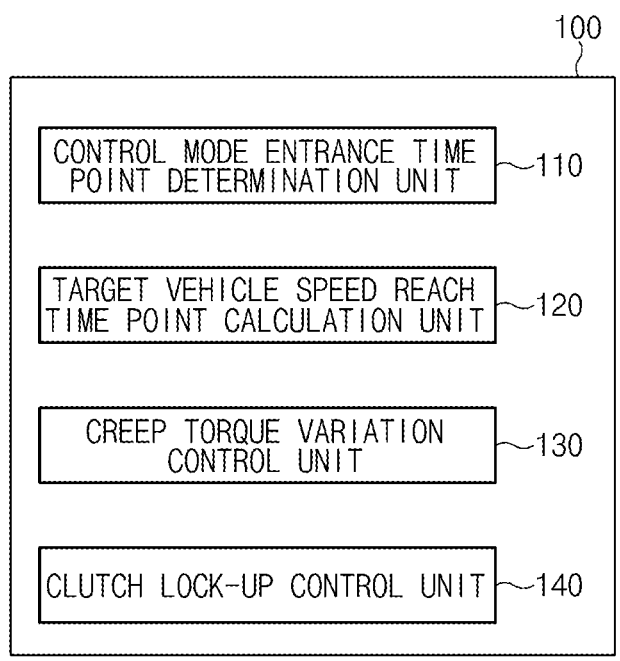
FIG. 1 is a block diagram illustrating the configuration of an apparatus for controlling a coasting operation in a hybrid vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In addition, a detailed description of well-known features or functions will be ruled out in order to not unnecessarily obscure the gist of the present disclosure.

In the following description of elements in exemplary forms of the present disclosure, the terms 'first', 'second', 'A', 'B', '(a)', and '(b)' may be used. The terms are used only to distinguish relevant elements from other elements, and the nature, the order, or the sequence of the relevant elements is not limited to the terms. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, the exemplary forms of the present disclosure will be described with reference to FIGS. 1 to 7.

FIG. 1 is a block diagram illustrating the configuration of an apparatus for controlling a coasting operation in a hybrid vehicle, in one form.

Radar coasting control is to control a coasting operation while maintaining the distance to a front vehicle using a radar mounted in a smart control system (smart cruise control; SCC), or in a vehicle. In one form, the controlling of the coasting operation includes the radar coasting control.

According to one form, the apparatus for controlling the coasting operation in the hybrid vehicle includes a control mode entrance time point determination unit 110, a target vehicle speed reach time point calculation unit 120, a creep torque variation control unit 130, and a clutch lock-up control unit 140.

The control mode entrance time point determination unit 110 calculates a time point at which the subject vehicle arrives at a front vehicle using the difference between a present vehicle speed of the subject vehicle and a present vehicle speed of the front vehicle, and a distance between the subject vehicle and the front vehicle. The control mode entrance time point determination unit 110 enters a coasting operation control mode when the time point, at which the subject vehicle arrives at the front vehicle, is within a preset threshold value. In this case, regarding the preset threshold value, the range of the preset threshold value may be adjusted by a user. For example, when the subject vehicle has a sufficient distance and sufficient time until arriving at the front vehicle, the subject vehicle may enter the coasting operation control mode.

Figure 2:
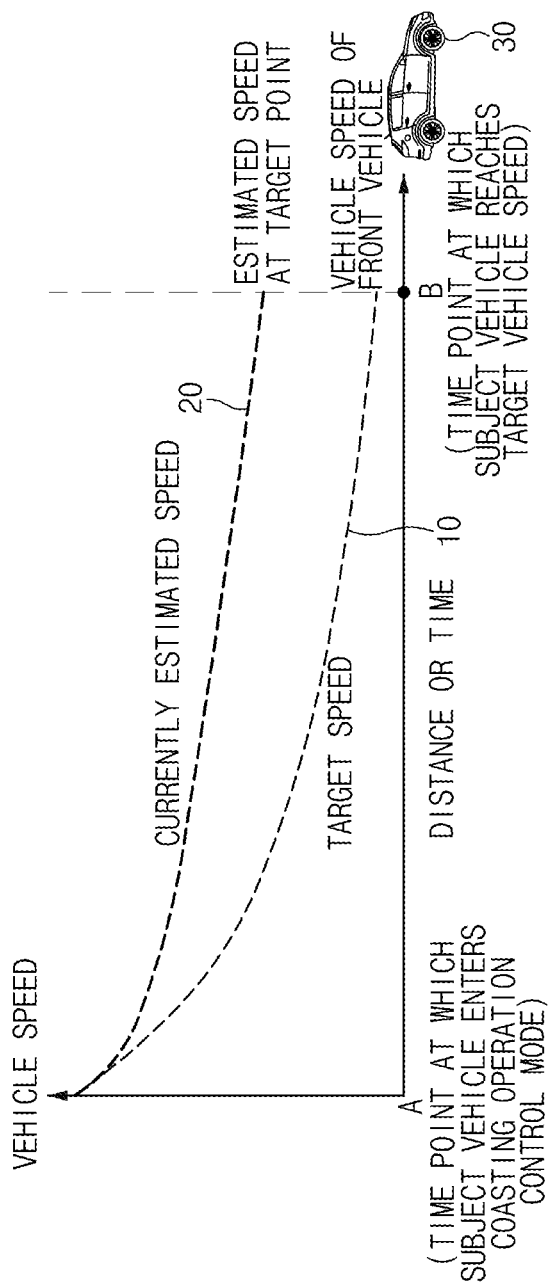
FIG. 2 is a graph illustrating time points at which a subject vehicle reaches a target vehicle speed and reaches the same vehicle speed as that of a front vehicle for explanation.

The target vehicle speed reach time point calculation unit 120 calculates a target vehicle speed of the subject vehicle and a time point at which the subject vehicle reaches the target vehicle speed when the subject vehicle enters the coasting operation control mode. In other words, the target vehicle speed reach time point calculation unit 120 may calculate the target vehicle speed using the present vehicle speed of the front vehicle, and may calculate the time point at which the subject vehicle reaches the target vehicle speed using the present vehicle speed of the front vehicle and the distance between the front vehicle and the subject vehicle. Referring to FIG. 2, the subject vehicle decelerates at a time point "A" at which the subject vehicle enters the coasting operation control mode and then reaches the target vehicle speed. In this case, the time point at which the subject vehicle reaches the target vehicle speed becomes "B".

For example, when the subject vehicle travels at 120 km/h, the front vehicle travels at 100 km/h, and the distance between the subject vehicle and the front vehicle is 1 km, the time point, at which the subject vehicle reaches the target vehicle speed (100 km/h equal to that of the front vehicle), may be determined at 50 m from the front vehicle 30.

In addition, when the subject vehicle travels at 80 km/h, the front vehicle runs at 60 km/h, and the distance between the subject vehicle and the front vehicle is 500 m, the time point, at which the subject vehicle reaches the target vehicle speed (60 km/h equal to that of the front vehicle), may be determined at 20 m from the front vehicle 30.

In other words, the target vehicle speed reach time point calculation unit 120 determines the time point, at which the subject vehicle reaches the target vehicle speed, using a distance from the front vehicle.

Referring to FIG. 2, when the subject vehicle performs the coasting operation at a present vehicle speed (see reference numeral 20), the vehicle speed of the subject vehicle may be higher than the target vehicle speed at the time point B at which the subject vehicle reaches the target vehicle speed. For example, even if the subject vehicle reaches at a point of 50 m from the front vehicle, the vehicle speed of the subject vehicle may be 110 km/h rather than 100 km/h. If the vehicle speed of the subject vehicle is 110 km/h, the subject vehicle may be braked, and the fuel efficiency may be degraded.

In this case, the target vehicle speed reach time point calculation unit 120 calculates the time point at which the subject vehicle reaches the target vehicle speed, thereby controlling the subject vehicle to reach the target vehicle speed at the time point at which the subject vehicle reaches the target vehicle speed.

In addition, the target vehicle speed reach time point calculation unit 120 may calculate a time point (T) at which the subject vehicle reaches the target vehicle speed by using a cost down value, an uphill load, a downhill load, and creep torque as expressed in Equation 1:

$$T=[(\text{a cost down value of a vehicle} \times k1)+(\text{an uphill/downhill load} \times k2)+(\text{creep torque} \times h)] \quad \text{Equation 1}$$

where, T is the time point at which the subject vehicle reaches the vehicle speed equal to that of the front vehicle, k1 and k2 are constants, and h is an efficiency value of a transmission, a drivetrain, or a drive wheel.

The creep torque variation control unit 130 controls creep torque using the difference between the target vehicle speed and the present vehicle speed of the subject vehicle.

The creep torque variation control unit 130 may decrease the creep torque when the present vehicle speed of the subject vehicle is higher than the target vehicle speed or may increase the creep torque when the present vehicle speed of the subject vehicle is lower than the target vehicle speed. In addition, the clutch lock-up control unit 140 determines whether regenerative braking occurs, when braking is desired after the creep torque control. The clutch lock-up control unit 140 maintains the creep torque when the regenerative braking occurs, and changes present creep torque to previous creep torque, which is present before the creep torque control, when brake-off occurs in the state of maintaining the creep torque. When the regenerative braking does not occur, the clutch lock-up control unit 140 switches to the previous creep torque which is present before the creep torque control.

Figure 3:
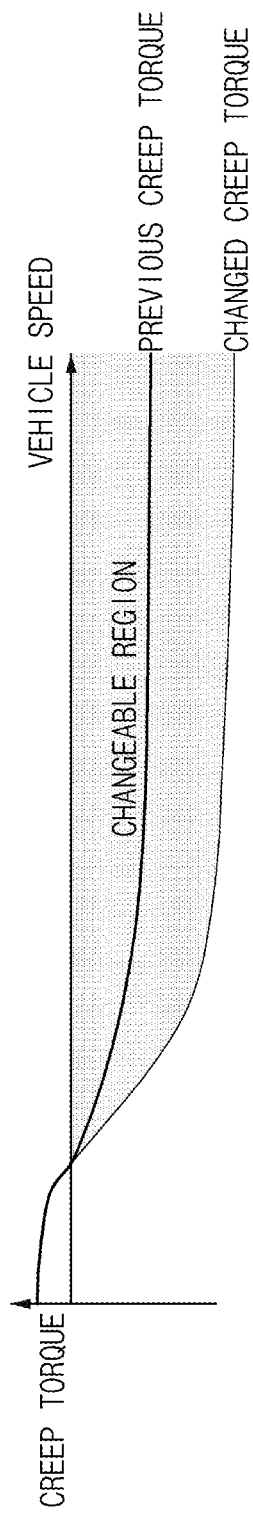
FIG. 3 is a graph illustrating the comparison between previous creep torque and changed creep torque for explanation.

The creep torque variation control unit 130 determines whether the subject vehicle arrives at a point at which the subject vehicle reaches the target vehicle speed, when the braking is not desired after the creep torque control, and may terminate the coasting operation control mode when the subject vehicle arrives at the point at which the subject vehicle reaches the target vehicle speed. FIG. 3 illustrates the creep torque variation based on the previous creep torque.

In this case, the creep torque variation control unit 130 may adjust a real creep torque ratio. The creep torque ratio may be calculated by Equation 2:

$$\text{Creep torque ratio} = \left(\text{variation of previous creep torque} \times \left(\frac{\text{Changed creep torque at braking start time point}}{\text{Previous creep torque at braking start time point}}\right)\right). \quad \text{Equation 2}$$

The clutch lock-up control unit 140 controls clutch lock-up using the present vehicle speed of the subject vehicle and the present vehicle speed of the front vehicle in the coasting operation control mode.

The clutch lock-up control unit 140 performs clutch open control when the present vehicle speed of the subject vehicle is higher than the present vehicle speed of the front vehicle, and maintains the clutch lock-up when the present vehicle speed of the subject vehicle is lower than the present vehicle speed of the front vehicle. In addition, the clutch lock-up control unit 140 performs the clutch open control when the braking is desired in the maintaining of the clutch lock-up. The clutch lock-up control unit 140 determines whether a time point, at which the subject vehicle reaches the target vehicle speed, comes when the braking is not desired in the maintaining of the clutch lock-up. The clutch lock-up control unit 140 terminates the coasting operation control mode when the time point, at which the subject vehicle reaches the target vehicle speed, comes.

As described above, according to one form, the coasting operation control logic is simplified through the mathematization of an existing manner of calculating an estimated speed or an operation distance based on a map, the mapping time is reduced, the control accuracy is improved through the creep torque variation, and the coasting operation control is possible even in uphill driving or flat road driving.

Figure 4:
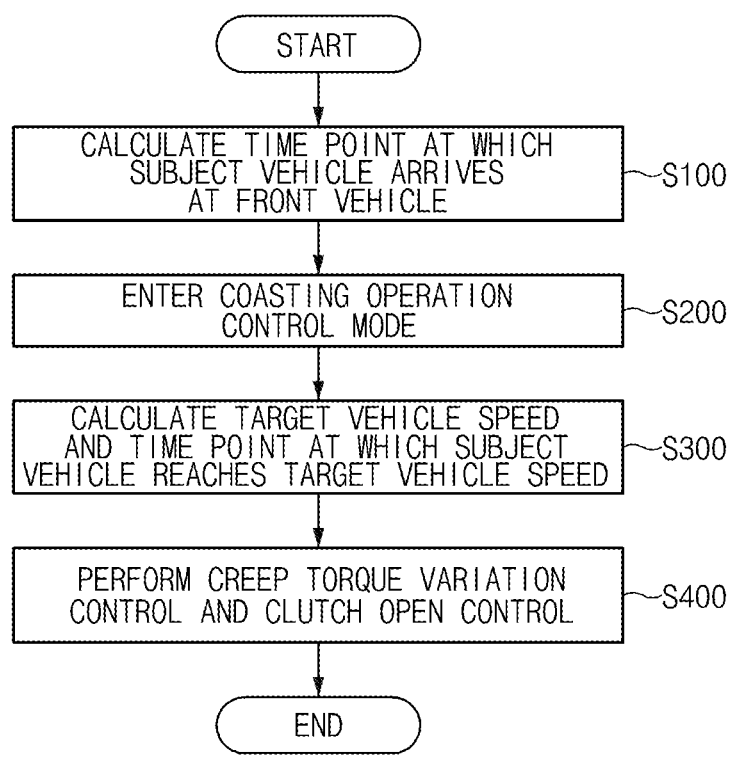
FIG. 4 is a flowchart illustrating a method of controlling a coasting operation in a hybrid vehicle.

Hereinafter, a method of controlling a coasting operation in a hybrid vehicle according to one form will be described with reference to FIG. 4.

The apparatus 100 for controlling the coasting operation in the hybrid vehicle calculates the time point at which a subject vehicle arrives at a front vehicle using the difference between a present vehicle speed of the subject vehicle and a present vehicle speed of the front vehicle, and a distance between the subject vehicle and the front vehicle (step S100). The apparatus 100 for controlling the coasting operation in the hybrid vehicle determines a time point to enter a coasting operation control mode by determining whether a time point, at which the subject vehicle arrives at the front vehicle, is within a preset threshold value (step S200). In other words, when the time point, at which the subject vehicle arrives at the front vehicle, is within the preset threshold value, the apparatus 100 for controlling the coasting operation in the hybrid vehicle determines the time point, at which the subject vehicle enters the costing operation control mode, to enter the coasting operation control mode. For example, the apparatus 100 may enter the coasting operation control mode when the subject vehicle has a sufficient distance and sufficient time until arriving at the front vehicle.

Thereafter, the apparatus 100 for controlling the coasting operation in the hybrid vehicle calculates a target vehicle speed and a time point at which the subject vehicle reaches the target vehicle speed (step S300). In this case, the target vehicle speed refers to a speed allowing the subject vehicle to travel based on the vehicle speed of the front vehicle while maintaining a predetermined distance from the front vehicle without colliding with the front vehicle. In general, the vehicle speed of the front vehicle may be a target vehicle speed. The calculation of the time point to reach the target vehicle speed refers to the calculation of a time point at which the vehicle speed of the subject vehicle reaches the target vehicle speed. Referring to FIG. 2, as the subject vehicle starts controlling a coasting operation, the vehicle speed of the subject vehicle is gradually decreased to reach the target vehicle speed. In this case, the time point at which the subject vehicle reaches the target vehicle speed becomes "B".

The apparatus 100 for controlling the coasting operation in the hybrid vehicle performs creep torque variation control and clutch open control (step S400).

Figure 5:
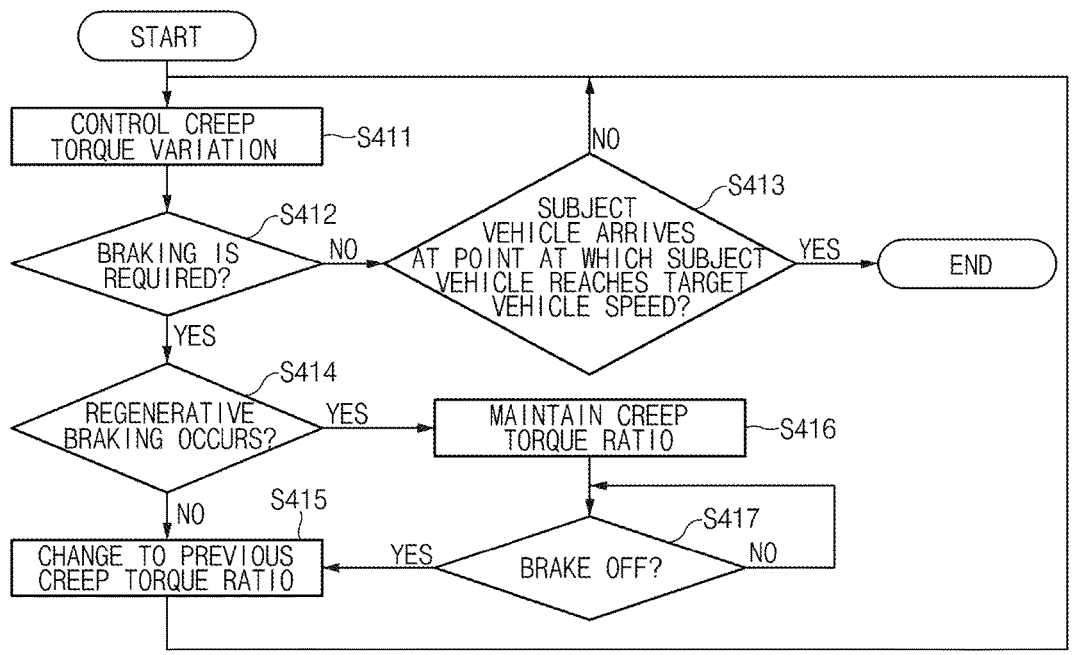
FIG. 5 is a flowchart illustrating a creep torque variation control manner of FIG. 4 in detail.
Figure 6:
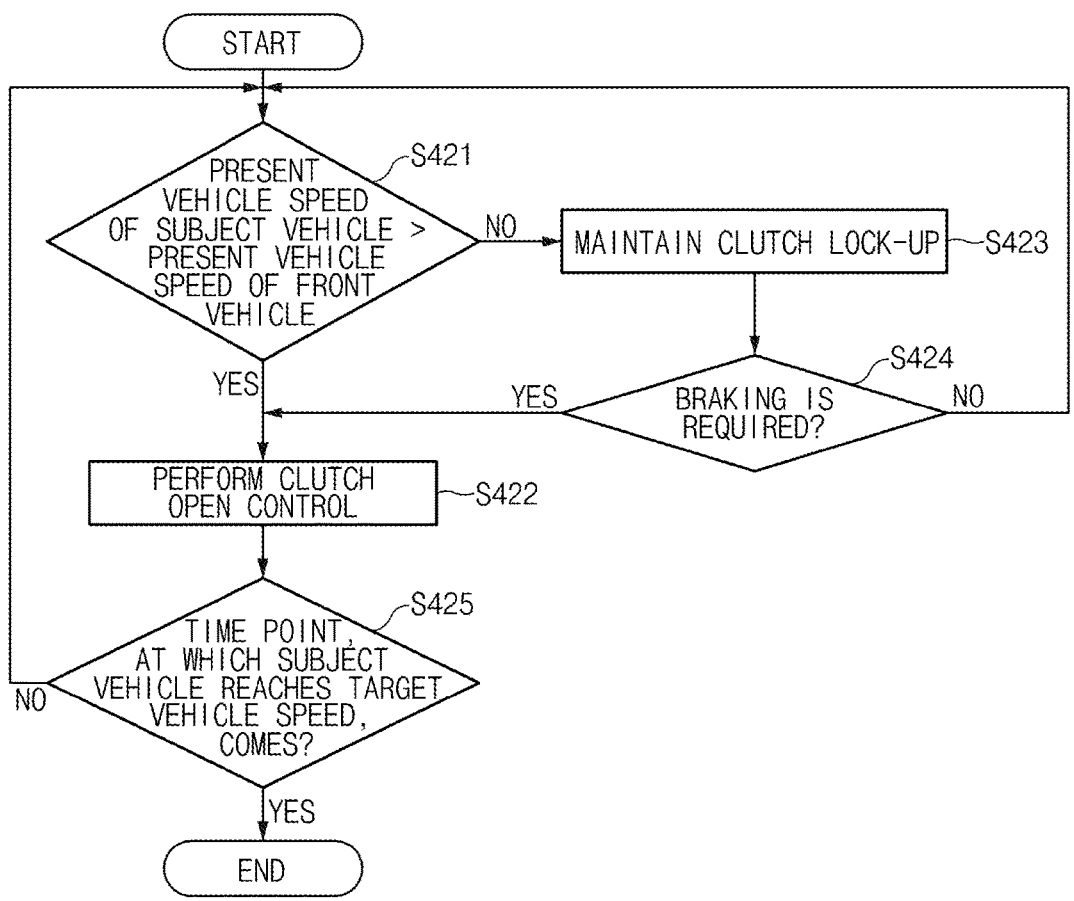
FIG. 6 is a flowchart illustrating a clutch lock-up control manner of FIG. 4.

Hereinafter, the creep torque control and the clutch open control will be described in detail with references to FIGS. 5 and 6.

Hereinafter, a creep torque variation control manner of FIG. 4 will be described in detail with reference to FIG. 5.

The apparatus 100 for controlling the coasting operation in the hybrid vehicle performs the creep torque variation control using the target vehicle speed and the present vehicle speed of the subject vehicle (step S411).

More specifically, the apparatus 100 for controlling the coasting operation in the hybrid vehicle decreases creep torque when the present vehicle speed of the subject vehicle is higher than the target vehicle speed, and increases the creep torque when the present vehicle speed of the subject vehicle is lower than the target vehicle speed.

Thereafter, the apparatus 100 for controlling the coasting operation in the hybrid vehicle determines whether braking is desired (step S412), that is, determines whether regenerative braking occurs, when the braking is desired, that is, a driver presses a brake pedal (step S414).

When the regenerative braking occurs, the apparatus 100 for controlling the coasting operation in the hybrid vehicle maintains a creep torque ratio (step S416), and determines whether brake-off occurs while the creep torque ratio is maintained (step S417). The apparatus 100 for controlling the coasting operation in the hybrid vehicle changes the creep torque ratio to the previous creep torque ratio which is present before the creep torque control (step S415). The apparatus 100 for controlling the coasting operation in the hybrid vehicle maintains the creep torque ratio when the brake-off does not occur (step S416).

Meanwhile, when the regenerative braking does not occur in step S414, the apparatus 100 for controlling the coasting operation in the hybrid vehicle changes the creep torque ratio to the previous creep torque ratio which is present before the creep torque control (step S415).

In addition, when the braking is not desired after the creep torque control in step S412, the apparatus 100 for controlling the coasting operation in the hybrid vehicle determines whether the subject vehicle arrives at a point at which the subject vehicle reaches the target vehicle speed (step S413), and terminates the coasting operation control mode when the subject vehicle arrives at the point at which the subject vehicle reaches the target vehicle speed.

Hereinafter, a clutch lock-up control manner of FIG. 4 will be described in detail with reference to FIG. 6.

The apparatus 100 for controlling the coasting operation in the hybrid vehicle controls clutch lock-up using the present vehicle speeds of the subject vehicle and the front vehicle in the coasting operation (step S421).

In other words, the apparatus 100 for controlling the coasting operation in the hybrid vehicle performs clutch open control (step S422) when the present vehicle speed of the subject vehicle is higher than the present vehicle speed of the front vehicle, and maintains the clutch lock-up when the present vehicle speed of the subject vehicle is lower than the present vehicle speed of the front vehicle (step S423).

In this case, the apparatus 100 for controlling the coasting operation in the hybrid vehicle performs the clutch open control (step S422) when braking is desired in the step of maintaining the clutch lock-up (step S424). Thereafter, the apparatus 100 for controlling the coasting operation in the hybrid vehicle terminates the coasting operation control when the time point, at which the subject vehicle reaches the target vehicle speed, comes (step S425).

The apparatus 100 for controlling the coasting operation in the hybrid vehicle returns to step S421 when the braking is not desired in the step of maintaining the clutch lock-up.

According to a method of controlling the coasting operation of the related art, when the subject vehicle runs on an uphill road and the driver steps off the accelerator pedal under the coasting operation, the speed of the front vehicle decreases fast and thus the distance between the subject and front vehicles is getting apart fast. Thus, a driver must press an accelerator pedal in the uphill driving. In other words, the driver needs to often depress and press the accelerator pedal to turn off/on an engine, so that energy loss occurs due to frequent engine on/off operations. In addition, the fact that the driver needs to frequently manipulate the accelerator pedal causes inconvenience. Therefore, the coasting operation is not performed in uphill driving. Even in flat road driving, although the manipulation frequency of the accelerator pedal is relatively reduced as compared with that in the uphill driving, the accelerator pedal is frequently manipulated, and the engine is frequently turned on/off to maintain the vehicle speed of the subject vehicle to that of the front vehicle. Meanwhile, although, in downhill driving, the manipulation frequency of the accelerator pedal is relatively reduced so that the engine is not frequently turned on/off to improve fuel efficiency, the subject vehicle significantly closely approaches the front vehicle.

Therefore, in one form of the present disclosure, the coasting operation control, which is performed only in the downhill driving in the related art, may be performed even in the flat road driving through creep torque variation. Accordingly, the fuel efficiency may be improved.

In addition, according to the related art, complex logic and a mapping manner based on a test value increase errors when environment conditions are changed. In the present disclosure, the coasting operation control logic is simplified and mapping is easily performed through the mathematization or the simplification of an existing manner of calculating an estimated speed or an operation distance based on a map.

In the related art, the conventional logic desires three weeks for each specification, an AE/DE desires 12 weeks with respect to domestic and North American specifications, and all tests must be performed with respect to driving loads of a vehicle based on a map. However, in the present disclosure, the tests are substantially possible through computation, and computation accuracy may be more increased through active control.

Further, the accuracy of the coasting operation control may be improved through creep torque variation in one form of the present disclosure.

As described above, the fuel efficiency may be increased by increasing the accuracy of the coasting operation control, the coasting operation control logic may be simplified, and the mapping based on the test value is reduced, thereby reducing mapping time and providing the control accuracy of the coasting operation through active control.

Further, the fuel efficiency is improved and a smart car image is constructed, thereby helping a consumer determine the purchase of a vehicle, so that the marketability is increased. Accordingly, the present disclosure may be applied to all vehicle types of hybrid electric vehicles (HEV) and plug-in hybrid electric vehicles (PHEV) to be developed in the future, among YG, HEV/AE/DE, and PHEV vehicles.

Figure 7:
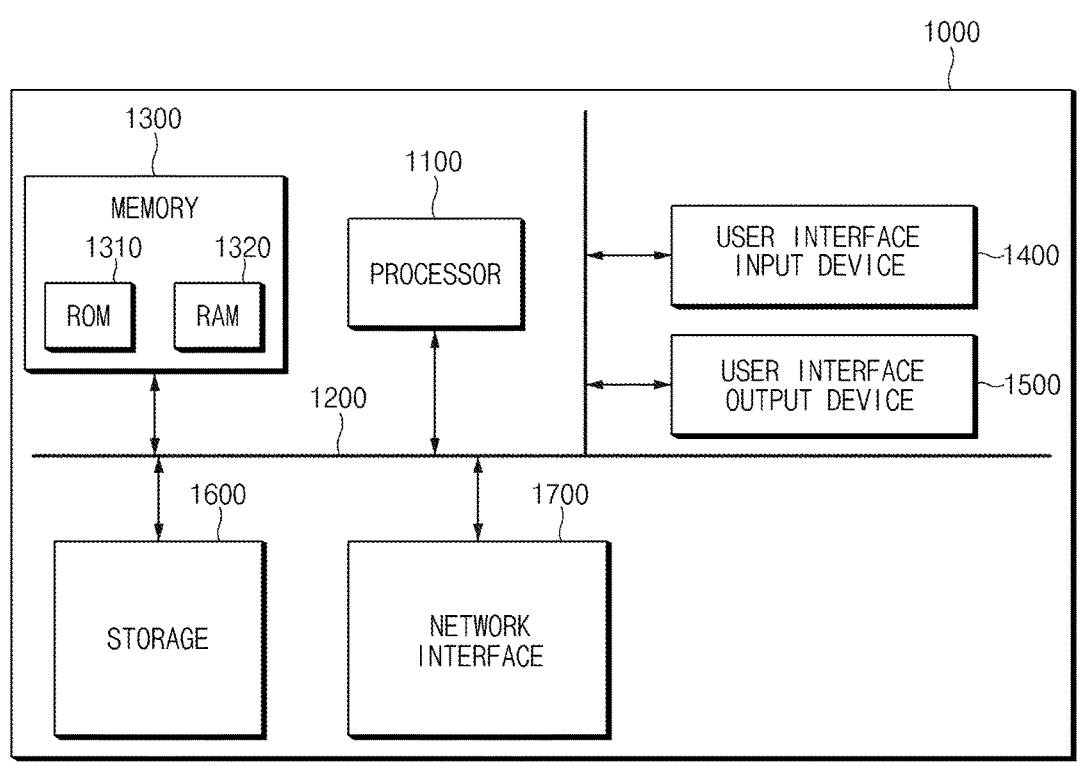
FIG. 7 is a block diagram illustrating the configuration of a computer system, to which the method of controlling the coasting operation in the hybrid vehicle is applied.

FIG. 7 is a block diagram illustrating the configuration of a computer system, to which the method of controlling the coasting operation in the hybrid vehicle is applied, according to one form of the present disclosure.

Referring to FIG. 7, the computing system 1000 may include at least one processor 1100, a memory 1300, a user interface input device 1400, a user interface output device 1500, a storage 1600, and a network interface 1700, which are connected to each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the forms disclosed in the present disclosure may be directly implemented with a hardware module, a software module, or combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM).

The storage medium may be coupled to the processor 1100. The processor 1100 may read out information from the storage medium and may write information in the storage medium. Alternatively, the storage medium may be integrated with the processor 1100. The integrated processor and storage medium may reside in an application specific integrated circuit (ASIC). The ASIC may reside in a user terminal. Alternatively, the integrated processor and storage medium may reside as a separate component of the user terminal.

As described above, the coasting operation control logic may be simplified and the accuracy of the coasting operation control may be increased, thereby increasing fuel efficiency, and the mapping based on the test value may be reduced, thereby reducing mapping time.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

What is claimed is:

1. An apparatus for controlling a coasting operation in a hybrid vehicle, the apparatus comprising:
   a coasting operation control mode entrance time point determination unit configured to determine a first time point at which a subject vehicle enters a coasting operation control mode;
   a target vehicle speed reach time point calculation unit configured to calculate a target vehicle speed of the subject vehicle and a second time point, at which the subject vehicle reaches the target vehicle speed, when the subject vehicle enters the coasting operation control mode; and
   a creep torque variation control unit configured to control a creep torque of the subject vehicle using a difference between the target vehicle speed and a present vehicle speed of the subject vehicle.

2. The apparatus of claim 1, wherein the coasting operation control mode entrance time point determination unit is configured to:
   calculate a third time point at which the subject vehicle arrives at a front vehicle based on a difference between the present vehicle speed of the subject vehicle and a present vehicle speed of the front vehicle, and a distance between the subject vehicle and the front vehicle; and
   enter the coasting operation control mode when the third time point, at which the subject vehicle arrives at the front vehicle, is within a preset threshold value.

3. The apparatus of claim 2, wherein the target vehicle speed reach time point calculation unit is configured to:
   calculate the target vehicle speed based on the present vehicle speed of the front vehicle; and
   calculate the second time point at which the subject vehicle reaches the target vehicle speed based on the present vehicle speed of the front vehicle and the distance between the front vehicle and the subject vehicle.

4. The apparatus of claim 3, wherein the target vehicle speed reach time point calculation unit is configured to:
   calculate the second time point at which the subject vehicle reaches the target vehicle speed using a coast down value, a downhill load, an uphill load, and the creep torque of the subject vehicle.

5. The apparatus of claim 1, wherein the creep torque variation control unit is configured to:
   decrease the creep torque when the present vehicle speed of the subject vehicle is greater than the target vehicle speed; and
   increase the creep torque when the present vehicle speed of the subject vehicle is lower than the target vehicle speed.

6. The apparatus of claim 5, wherein the creep torque variation control unit is configured to:
   determine whether regenerative braking occurs, when braking is desired after the creep torque control;
   maintain the creep torque when the regenerative braking occurs;
   change the creep torque to a previous creep torque, which is present before the creep torque control, when brake-off occurs while the creep torque is maintained; and
   change the creep torque to the previous creep torque, which is present before the creep torque control, when the regenerative braking does not occur.

7. The apparatus of claim 6, wherein the creep torque variation control unit is configured to:
   determine whether the subject vehicle arrives at the second time point at which the subject vehicle reaches the target vehicle speed, when the braking is not desired after the creep torque control; and
   terminate the coasting operation control mode when the subject vehicle arrives at the second the point at which the subject vehicle reaches the target vehicle speed.

8. The apparatus of claim 1, further comprising:
   a clutch lock-up control unit configured to control clutch lock-up using the present vehicle speed of the subject vehicle and a present vehicle speed of a front vehicle in the coasting operation control mode.

9. The apparatus of claim 8, wherein the clutch lock-up control unit is configured to:
   perform clutch open control when the present vehicle speed of the subject vehicle is greater than the present vehicle speed of the front vehicle; and
   maintain the clutch lock-up when the present vehicle speed of the subject vehicle is lower than the present vehicle speed of the front vehicle.

10. The apparatus of claim 9, wherein the clutch lock-up control unit is configured to:
    perform the clutch open control when braking is desired in the maintaining of the clutch lock-up;
    determine whether the second time point, at which the subject vehicle reaches the target vehicle speed, comes in the performing of the clutch open control; and
    terminate the coasting operation control mode when the second time point, at which the subject vehicle reaches the target vehicle speed, comes.

11. A method of controlling a coasting operation in a hybrid vehicle, the method comprising:
    determining, by a coasting operation control mode entrance time point determination unit, a first time point at which a subject vehicle enters a coasting operation control mode;
    calculating, by a target vehicle speed reach time point calculation unit, a target vehicle speed of the subject vehicle and a second time point, at which the subject vehicle reaches the target vehicle speed, when the subject vehicle enters the coasting operation control mode; and
    controlling, by a clutch lock-up control unit, clutch lock-up using a present vehicle speed of the subject vehicle and a present vehicle speed of a front vehicle in the coasting operation control mode.

12. A method of controlling a coasting operation in a hybrid vehicle, the method comprising:
    determining, by a coasting operation control mode entrance time point determination unit, a first time point at which a subject vehicle enters a coasting operation control mode;
    calculating, by a target vehicle speed reach time point calculation unit, a target vehicle speed of the subject vehicle and a second time point, at which the subject vehicle reaches the target vehicle speed, when the subject vehicle enters the coasting operation control mode; and controlling, by a creep torque variation control unit, creep torque of the subject vehicle using a difference between the target vehicle speed and a present vehicle speed of the subject vehicle.

13. The method of claim 12, wherein the determining of the first time point at which the subject vehicle enters the coasting operation control mode comprises:

calculating a third time point at which the subject vehicle arrives at a front vehicle based on a difference between the present vehicle speed of the subject vehicle and a present vehicle speed of the front vehicle, and a distance between the subject vehicle and the front vehicle; and entering the coasting operation control mode when the third time point, at which the subject vehicle arrives at the front vehicle, is within a preset threshold value.

14. The method of claim 12, wherein the calculating of the target vehicle speed and the second time point comprises:

calculating the target vehicle speed using a present vehicle speed of a front vehicle; and calculating the second time point using the present vehicle speed of the front vehicle and a distance between the front vehicle and the subject vehicle.

15. The method of claim 14, wherein the calculating of the second time point uses a coast down value, a downhill load, an uphill load, and the creep torque of the subject vehicle.

16. The method of claim 15, wherein the controlling of the creep torque comprises:

decreasing the creep torque when the present vehicle speed of the subject vehicle is higher than the target vehicle speed; and increasing the creep torque when the present vehicle speed of the subject vehicle is lower than the target vehicle speed.

17. The method of claim 16, wherein the controlling of the creep torque further comprises:

determining whether regenerative braking occurs when braking is desired after the creep torque control;

maintaining the creep torque when the regenerative braking occurs; and changing the creep torque to a previous creep torque, which is present before the creep torque control, when brake-off occurs while the creep torque is maintained.

18. The method of claim 17, wherein the controlling of the creep torque further comprises:

changing the creep torque to the previous creep torque, which is present before the creep torque control, when the regenerative braking does not occur.

19. The method of claim 18, further comprising:

determining whether the subject vehicle arrives at the second time point, when the braking is not desired after the creep torque control; and terminating the coasting operation control mode when the subject vehicle arrives at the second time point at which the subject vehicle reaches the target vehicle speed.

20. The method of claim 12, further comprising:

controlling clutch lock-up using the present vehicle speed of the subject vehicle and a present vehicle speed of a front vehicle in the coasting operation.

21. The method of claim 20, wherein the controlling of the clutch lock-up comprises:

performing clutch open control when the present vehicle speed of the subject vehicle is higher than the present vehicle speed of the front vehicle; and maintaining the clutch lock-up when the present vehicle speed of the subject vehicle is lower than the present vehicle speed of the front vehicle.

22. The method of claim 21, wherein the controlling of the clutch lock-up further comprises:

performing the clutch open control when braking is desired in the maintaining of the clutch lock-up.

23. The method of claim 22, wherein the controlling of the clutch lock-up further comprises:

determining whether the second time point, at which the subject vehicle reaches the target vehicle speed, comes in the performing of the clutch open control; and terminating the coasting operation control mode when the second time point comes.

* * * * *